United States Patent

[11] 3,543,989

[72] Inventor Cleveland N. Cooper
  Kirkwood, Missouri
[21] Appl. No. 693,276
[22] Filed Dec. 26, 1967
[45] Patented Dec. 1, 1970
[73] Assignee The Pandjiris Weldment Co.
  St. Louis, Missouri
  a corporation of Missouri

[54] MANIPULATOR FOR WELDING OR CUTTING APPARATUS
  10 Claims, 11 Drawing Figs.
[52] U.S. Cl. .................................................. 228/25,
  182/141; 228/45, 228/57; 254/7; 269/60, 269/61;
  266/23
[51] Int. Cl. ..................................................... B23k 1/00,
  B23k 5/00
[50] Field of Search .......................................... 228/25, 45;
  269/60, 61; 254/7; 182/141; 266/23

[56] References Cited
UNITED STATES PATENTS
2,786,434 3/1957 Klungtvedt .................. 269/60
3,255,944 6/1966 Yardon et al. ................ 228/25
2,749,421 6/1956 Mikulak et al. ............... 228/45
3,455,495 7/1969 Vest ........................... 228/45

Primary Examiner—John F. Campbell
Assistant Examiner—Robert J. Craig
Attorney—Cohn and Powell ABSTRACT: A manipulator for welding or cutting operations, having substantially horizontal boom carried by a support member of a parallelogram linkage pivoted on a substantially vertical column. The manipulator directly mounts every type of welding head, whether automatic, semiautomatic or gun-type wire feeder, or mounts a cutting torch. A height adjustment means, such as a jackscrew, is operatively connected to the pivoted parallelogram linkage for selectively adjusting the boom elevation. The boom is reciprocatively mounted for selective extension or retraction in positioning the operational tool, and is selectively locked in the adjusted position. Mounted on the top of the column is a platform adapted to support associated equipment, the platform having attachment lugs strategically placed to facilitate lifting of the unit by a hoist. The column is mounted for rotation on a substantially vertical swivel pin, and can be selectively locked in adjusted position. The relative disposition of the component parts provides a substantially balanced design and counterweight on opposite sides of the swivel axis for ease of operation, and on opposite sides of the attachment lugs for convenient lifting action.

Patented Dec. 1, 1970

INVENTOR
CLEVELAND N. COOPER
BY
Cohn and Powell
ATTORNEYS

INVENTOR
CLEVELAND N. COOPER
BY
Cohn and Powell
ATTORNEYS

Patented Dec. 1, 1970

INVENTOR
CLEVELAND N. COOPER
BY
*Cohn and Powell*

ATTORNEYS 3,543,989

MANIPULATOR FOR WELDING OR CUTTING APPARATUS

BACKGROUND OF THE INVENTION

This invention relates generally to improvements in a manipulator especially adapted for use in welding and cutting operations, and more particularly to a portable manipulator of this type which directly mounts any automatic semiautomatic or gun-type wire feeder now made for work on tanks, nozzles, manways, plates, I-beams and weldments, and yet is light enough to be moved by the smallest hoist or even by a fork lift.

The heretofore conventional manipulators incorporate a horizontal boom mounted on a vertical column by a saddle plate, the saddle plate being reciprocatively mounted by rollers and guide tracks on the column, and the boom being reciprocatively mounted by rollers and guide tracks on the saddle plate. These manipulators are constructed of a multiplicity of parts of relatively complex arrangement, and are usually of a large size and weight that precludes easy lifting, i.e. such units cannot be said to be portable in the true sense. For example, some manipulators are of a size that an operator sits on the end of the boom.

SUMMARY OF THE INVENTION

The manipulator incorporates a substantially horizontal boom carried by a parallelogram linkage pivotally connected to a substantially vertical column. The parallelogram linkage is pivoted by a height adjustment means to adjust the elevation of the boom selectively, in order to locate the operational tool. The tool, such as a welding head, always remains substantially vertical to the workpiece by means of the parallelogram linkage.

The boom is reciprocatively mounted on a support member of the parallelogram linkage so as to be selectively extensible or retractable laterally of the column. The manipulator, with its tool such as a welding head carried by the boom, is primarily intended for external welding, but can weld internally. Among the workpieces that can be serviced are tanks, nozzles, manways, plates, I-beams and other weldments.

The parallelogram linkage includes a pair of vertically spaced, substantially parallel bars pivotally connected to the column and pivotally connected to the support member on which the boom is mounted. This double-bar design maintains perfect arc stability.

The boom is mounted for reciprocative movement by antifriction rollers, and can be selectively locked in adjusted, extended position by a positive screw lock.

A platform at the top of the column supports equipment compatible and cooperating with the tool carried by the boom. Extending from opposite sides of the platform and from opposite sides of the parallelogram linkage and boom are a pair of lugs, constituting attachment points, for lifting the manipulator. The unit is light enough to be moved by the smallest hoist with this lift assembly or by a fork lift.

A limit switch is electrically associated with the height adjustment means and is actuated by coacting means carried by the linkage as the boom is raised or lowered, the limit switch and coacting means determining the limits of pivotal movement of the linkage by deenergization of the height adjustment means.

The column is rotatively mounted for 360° movement on a substantially vertical swivel pin, and can be selectively locked in any angularly adjusted position.

The disposition of the swivel axis relative to the column and the parallelogram linkage, the disposition of the jackscrew relative to the linkage, and the disposition of the column foot member relative to the linkage, all provide a substantially balanced design about the swivel axis for easy operation and for convenient lifting of the unit.

DESCRIPTION OF THE PREFERRED EMBODIMENT

Figures 1, 2:
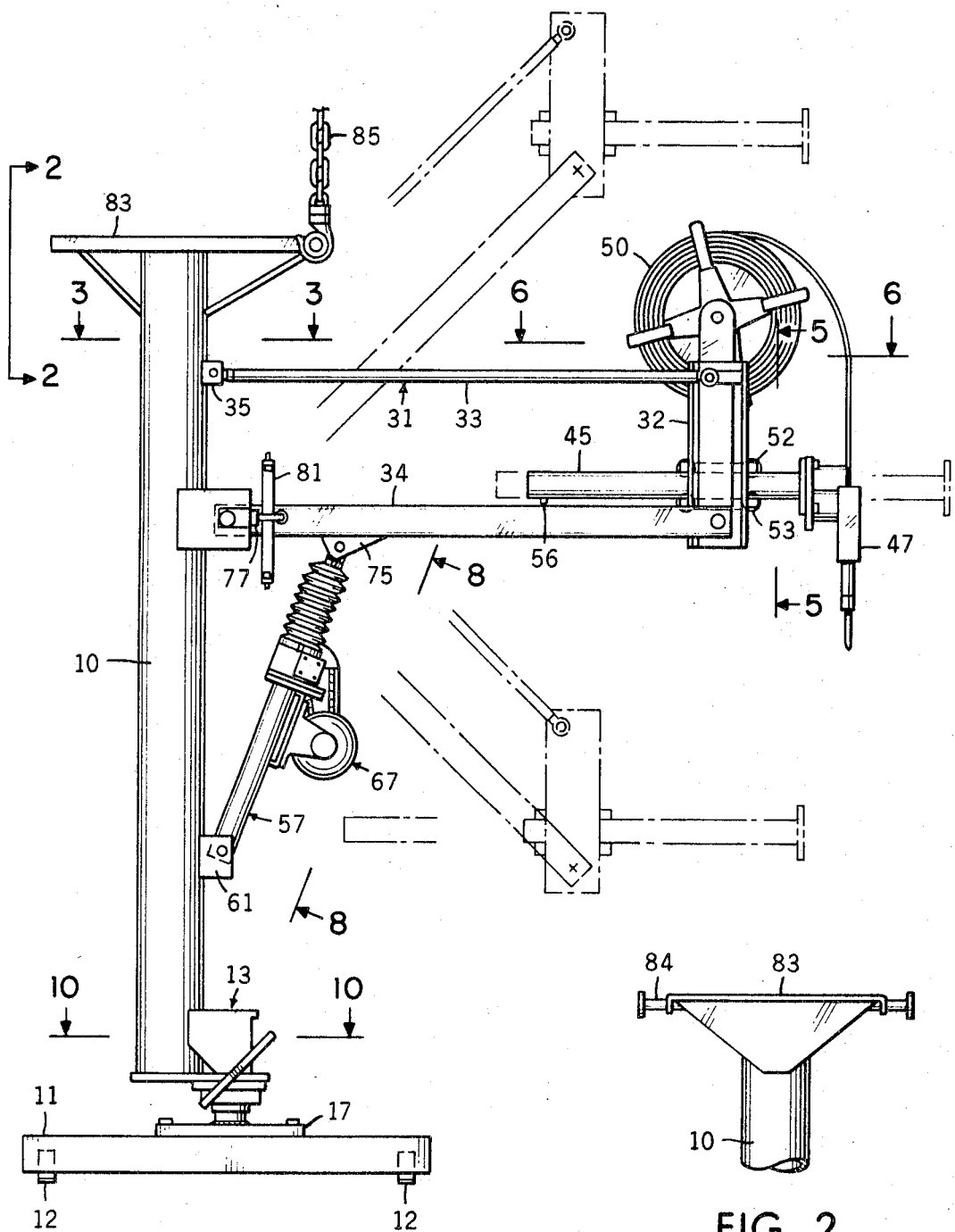
FIG. 1 is a side elevational view of the manipulator, the upper and lower limits of the boom being illustrated in broken lines.
FIG. 2 is a fragmentary, rear elevational view taken on line 2-2 of FIG. 1.
Figure 3:
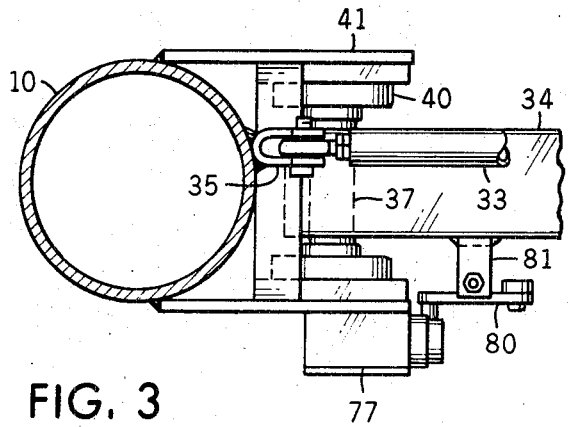
FIG. 3 is an enlarged, fragmentary cross-sectional view as taken on line 3-3 of FIG. 1.

Referring now by characters of reference to the drawings, and first to FIG. 1, it will be apparent that the manipulator includes a substantially vertical column 10 of tubular, circular cross section as shown in FIG. 3. The column 10 is supported on and carried by a base 11. The base 11 can sit freely on a subjacent supporting surface such as a floor, or be anchored to the floor or be selectively movable to different positions on the floor through the use of wheels 12.

Figure 10:
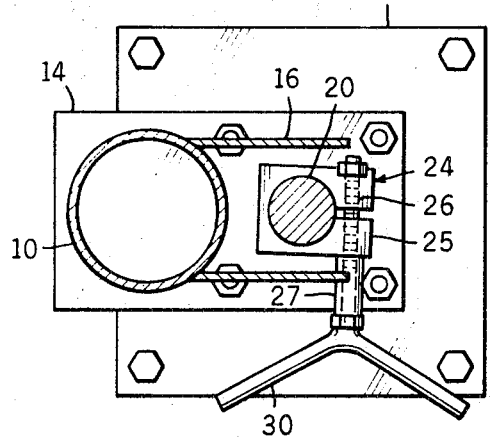
FIG. 10 is an enlarged, cross-sectional view as taken on line 10-10 of FIG. 1.
Figure 11:
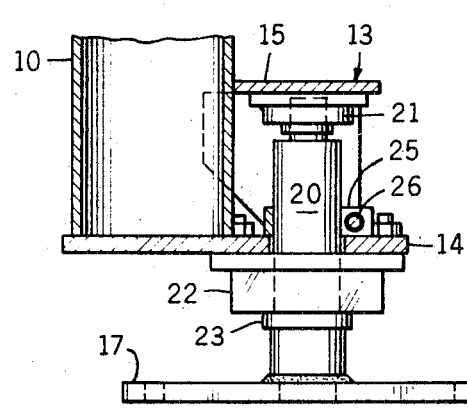
FIG. 11 is a cross-sectional view as seen in a vertical plane passed through the swivel axis of FIG. 10.

The column 10 is provided with a laterally extending foot member generally indicated by 13, the detailed construction of which is best shown in FIGS. 10 and 11. The foot member 13 includes a bottom plate 14 and a vertically spaced, parallel top plate 15. The bottom and top plates 14 and 15 are interconnected by a pair of side plates 16 attached to and extending from the column 10.

A swivel plate 17 is fixed to the top of the base 11. Extending upwardly from and carried by the swivel plate 17, is a swivel pin 20 defining a swivel axis. The swivel pin 20 projects through the bottom plate 14 of the column foot member 13 and is journaled in a bearing 21 attached to the top plate 15. Attached to the underside of bottom plate 14 is a bearing 22 that receives the swivel pin 20 and which seats slidably on a sleeve collar 23.

The swivel axis defined by swivel pin 20 is laterally offset from the vertical column 10. The column 10 can swivel selectively a full 360° about the swivel axis.

A lock means 24 fixes the column 10 selectively in any adjusted angular position. This lock means 24 includes a split collar 25 embracing the swivel pin 20. A bolt 26 extends through the bifurcated sides of the split collar 25. A turn nut 27 is threadedly attached to one end of nut 26, the turn nut 27 being provided with a handle 30 for convenient turning operation. When the turn nut 27 is loosened, the lock collar 25 can turn freely on the swivel pin 20, and hence the column 10 can swivel about the swivel axis. When the turn nut 27 is tightened the lock collar 25 is fixed to the swivel pin 20, and one plate 16 of the foot member 13 engages the turn nut 27 to preclude swiveling of the foot member 13 and column 10.

Figure 5:
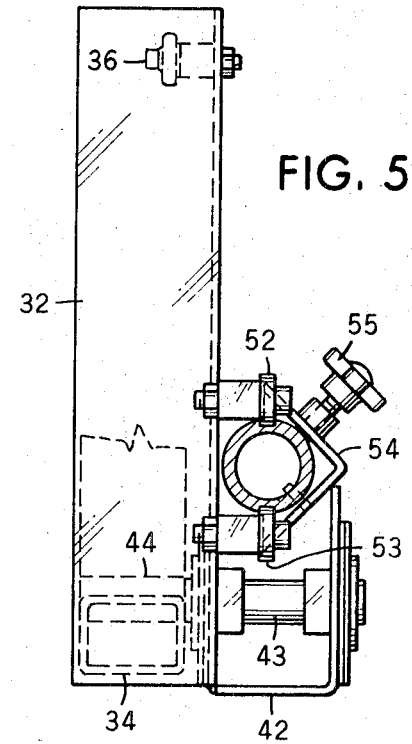
FIG. 5 is an enlarged, cross-sectional view as taken on line 5-5 of FIG. 1.
Figure 6:
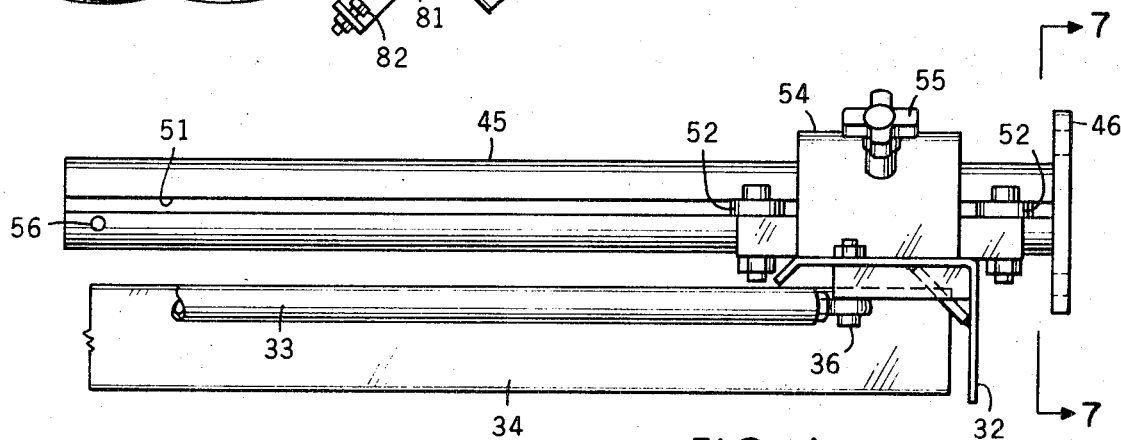
FIG. 6 is an enlarged, fragmentary top plan view taken on line 6-6 of FIG. 1.
Figure 7:
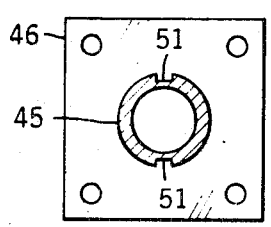
FIG. 7 is a cross-sectional view as taken on line 7-7 of FIG. 6.
Figure 9:
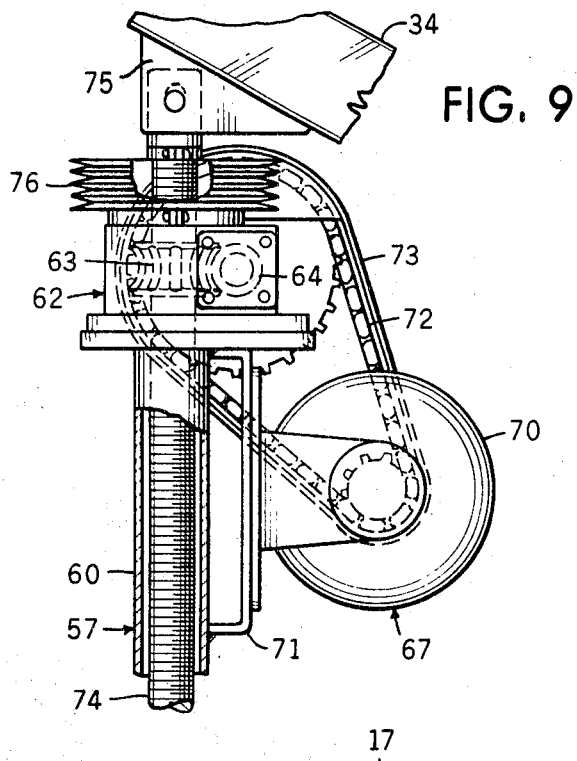
FIG. 9 is a fragmentary side elevational view of the height adjustment means as seen from the left of FIG. 8.

Secured to and extending laterally from the column 10, is a parallelogram linkage generally referred to by 31, the linkage 31 being located vertically above and extending laterally in the same general direction as the column foot member 13. The parallelogram linkage 31 includes a support member 32 supported outwardly from column 10 by a pair of vertically spaced, substantially parallel bars 33 and 34. The elongate upper bar 33 is pivotally connected at one end to a bracket 35 attached to the column 10, and is pivotally connected at the opposite end to the support member 32 by pivot pin 36 (FIG. 6). One end of the lower bar 34 is pivoted on a shaft 37 that is fixed to and extends between bearings 40 carried by spaced bracket plates 41. This pivot connection is best illustrated in FIG. 3. The pivot connection of the opposite end of the lower bar 34 is best illustrated in FIG. 5. The support member 32 includes a substantially L-shaped bracket 42 at one side. A pivot pin 43 is carried by the bracket 42 and extends through the support member 32 to provide a stub pin 44 at the opposite side. The lower bar 34 is pivotally mounted on the stub pin 44.

A substantially horizontal boom 45 is carried by the support member 32 of the parallelogram linkage 31. As is best illustrated in FIG. 6, the boom 45 includes a faceplate 46 at its outer end, the faceplate 46 holding an operational tool 47 (FIG. 1) such as a welding head. Supported on the top of support number 32 is a wire reel 50 that is operatively connected to the operational tool 47.

The mounting means for the boom 45 includes longitudinal, upper and lower tracks 51 provided by grooves formed on the boom. A pair of rollers 52 carried by the support member 32, engage the upper track 51. A corresponding pair of rollers 53, also carried by the support member 32, engage the lower track 51. The action of the rollers 52 and 53 in the longitudinal boom tracks 51 constrains the boom 45 to a straight line, reciprocative movement between retracted and extended positions.

The lock means for selectively fixing the boom 45 in any adjusted retracted or extended position includes an angle bracket 54 (FIGS. 5 and 6) fixed to the upper end of bracket 42, the angle bracket 54 opening toward and receiving the boom 45. Preferably, the angle bracket 54 is located between the cooperating pairs of rollers 52 and 53. Threadedly attached to the angle bracket 54 is a lock bolt 55, the lock bolt 55 being adapted to engage the boom 45 selectively. When the lock bolt 55 is loosened and is disengaged from the boom 45, the boom 45 can be reciprocatively moved to any selected position. When located in the adjusted position, the lock bolt 55 is tightened to engage the boom 45, thereby locking the boom 45 in such adjusted position.

A stop shoulder 56 is carried by the rear end of boom 45. The stop shoulder 56 engages the angle bracket 54 upon extension of the boom 45 to determine the outermost limit of the boom 45 and to preclude unintentional withdrawal or disengagement.

Operatively connected between the parallelogram linkage 31 and the column 10 is a height adjustment means referred to by 57 in FIG. 1. In the preferred embodiment, the height adjustment means 57 is provided by a jackscrew. The height adjustment means includes an elongate sleeve 60 (FIG. 8) pivotally connected at its lower end to the column 10 by a bracket 61. Fixed to the upper end of the sleeve 60 is a gear unit 62 that incorporates a worm gear nut 63, a coacting worm 64 and a transfer shaft 65 carrying the worm 64.

Figure 8:
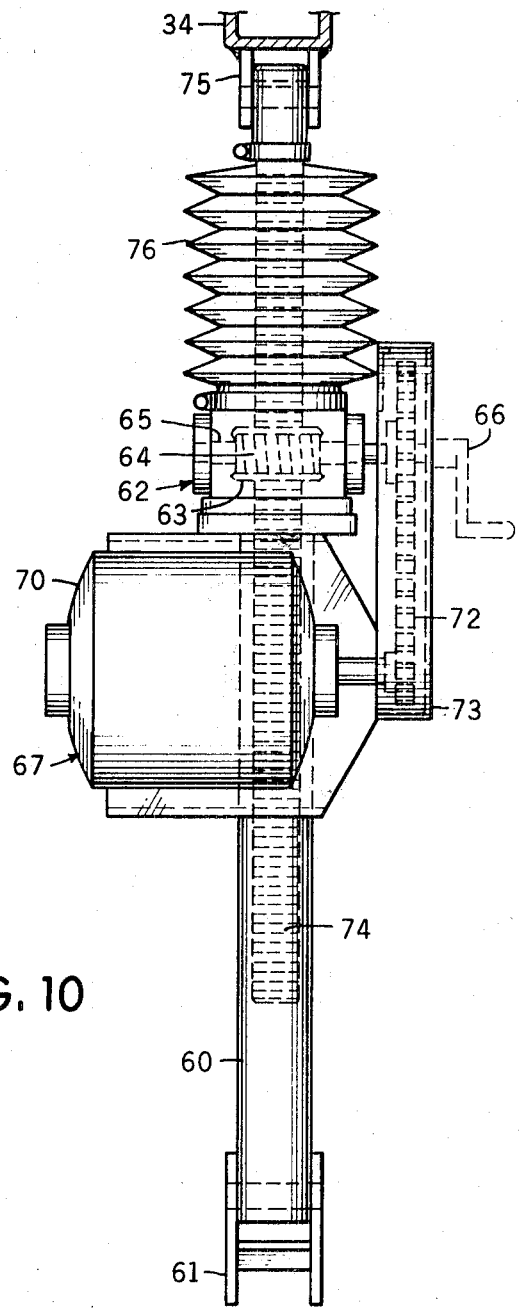
FIG. 8 is an enlarged, front elevational view of the height adjustment means as taken on line 8-8 of FIG. 1.

As is indicated by broken lines in FIG. 8, the wormshaft 65 can be turned manually by a suitable crank 66. Of course, the wormshaft 65 can be turned automatically by a power unit generally indicated by 67. The power unit includes a motor 70 carried by a platform 71 fixed to the sleeve 60. The motor 70 is operatively connected to the wormshaft 65 by a chain and sprocket drive connection 72. A housing shield 73 extends over the chain and sprocket drive connection 72 to provide protection and preclude injury.

In addition, the height adjustment means 57 includes an elongate screw 74 extending through the gear unit 62 and into the tubular sleeve 60. The upper end of the screw 74 is pivotally mounted by bracket 75 to the lower bar 34 of the parallelogram linkage 31. The worm gear nut 63 is threadedly received on the screw 74. Upon turning of the worm gear nut 63, either by the crank 66 or power unit 67, the screw 74 will be either retracted in or extended from the cooperating tubular sleeve 60 depending on the direction of rotation of the worm gear nut 63. Upon retraction of the screw 74, the parallelogram linkage 31 will be lowered, and conversely, upon extension of the screw 74, the parallelogram linkage 31 will be raised.

A flexible bellows 76 is disposed about the screw 74, one end of the bellows 76 being attached to the gear unit 62 and the other end of the bellows 76 being attached to the upper end of the screw 74. The bellows 76 will expand or collapse as the screw 74 is extended or retracted respectively. The bellows 76 provides a protective shield.

Figure 4:
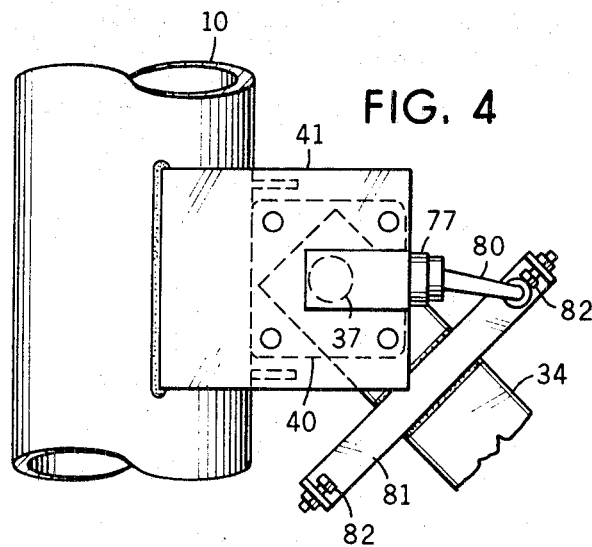
FIG. 4 is an enlarged, side elevational view of the limit switch and coacting means.

A limit switch 77 (FIG. 4) is carried by the bracket 41, and is operatively connected in a suitable electrical circuit with the motor 70 of the power unit 67. The limit switch 77 acts to deenergize the motor 70 to determine the upper and lower limits of movement of the parallelogram linkage 31. The limit switch 77 includes an actuating switch arm 80. A cooperating switch-actuating arm 81 is attached to the lower bar 34. A pair of adjustable screws 82 are fixed to opposite ends of the arm 81. During usual swinging movement of the parallel linkage 31, the stop screws 82 will not engage the switch arm 80. However, upon reaching either the uppermost or lowermost limit of movement, one of the stop screws 82 will engage the switch arm 80 so as to open the electrical circuit and deenergize the motor 70. A slight adjustment in the uppermost and lowermost limits can be made by threadedly adjusting the stop screws 82.

Mounted on top of the column 10 is a platform 83. The platform 83 is adapted to support equipment compatible and cooperating with the operational tool 77 carried by the boom 45. A pair of lugs 84 are attached to and extend outwardly from opposite sides of the platform 83. The lugs 84 extend laterally on opposite sides of the parallelogram linkage 31 and boom 45, and provide attachment points for lifting of the manipulator by a hoist as represented by the chain and hook 85 in FIG. 1. Moreover, the lugs 84 are located forwardly of the vertical axis of the column 10 in the direction of the parallelogram linkage 31. As previously stated, the swivel axis is laterally offset from the column 10, is located between the boom 45 and column 10, and is located substantially in the plane of the parallelogram linkage 31. The height adjustment means 57 is located substantially in the plane of the parallelogram linkage 31 and column foot number 13. The stated relative disposition of the component parts provide a substantially balanced design and counterweight on opposite sides of the swivel axis for ease of operation, and on opposite sides of the attachment lugs 84 for convenient lifting action.

It is thought that the functional advantages of the manipulator have become fully apparent from the foregoing detailed description, but for completeness of disclosure, the usage will be briefly described. It will be assumed that the operational tool 47 affixed to the face plate 46 of boom 45 is a welding head, and that a wire reel 50 is carried by support member 32 and is operatively connected to the tool 47.

If it is desired to raise or lower the tool 47, the power unit 67 is energized to turn the worm gear nut 63, and thereby extend or retract the screw 74 from the height adjustment means 57. If the worm gear nut 63 is turned in a direction to extend the screw 54, the parallelogram linkage 31 will be swung upwardly. Conversely, if the worm gear nut 63 is turned in the opposite direction, the screw 74 will be retracted and the parallelogram linkage 31 will be swung downwardly. Because of the parallelogram linkage 31, the boom 45 carried by the support member 32 will be maintained substantially horizontal in all angular positions of the linkage 31. The uppermost and lowermost limits of the parallelogram linkage 31 is determined by the limit switch 77.

Of course, the boom 45 can be selectively extended or retracted in any angular position of the parallelogram linkage 31. To release the boom 45 for adjustment, the lock bolt 55 is loosened and the boom 45 is pushed inwardly or pulled outwardly in order to position the tool 47. When the boom 45 is disposed in the adjusted position, the lock bolt 55 is tightened to retain the boom 45. The boom 45 cannot be unintentionally withdrawn or disengaged from its mountings because the stop shoulder 56 will engage the angle bracket 54.

The tool 47 can be swung a full 360° about the swivel axis defined by swivel pin 20. First, the lock collar 25 is loosened by turning the nut 27. Then, the column 10 and the associated component parts are swung about the swivel axis to the adjusted position. When located in the adjusted position, the lock collar 25 is tightened on the swivel pin 20 to preclude any further turning of the column 10 about the swivel axis.

Any suitable operational tool 47 may be carried by the boom 45. Under some circumstances, coacting and associated equipment for the operational tool 47 can be supported and retained on platform 83.

When the base 10 is supported on wheels 12, the manipulator can be easily rolled from one location to the other. In those instances where the base without rollers sits on the floor, the manipulator may be hoisted by attachment of cables and hooks to the attachment lugs 84 or may be lifted by a forklift for placement in another location.

Although the invention has been described by making detailed reference to a single preferred embodiment, such detail is to be understood in an instructive, rather than in any restrictive sense, many variants being possible within the scope of the claims hereunto appended.

I claim:

1. A manipulator for welding or cutting operations, comprising:
   a. a substantially vertical column;
   b. a parallelogram linkage extending laterally from the column, the parallelogram linkage including:
      1. a support member; and
      2. a pair of vertically spaced, substantially parallel bars pivotally connected to the column and pivotally connected to the support member;
   c. a substantially horizontal boom carried by the support member;
   d. height adjustment means connected to one of the bars of the parallelogram linkage for pivoting the bars and selectably adjusting the elevation of the boom;
   e. an operational tool carried by the boom;
   f. mounting means reciprocatively mounting the boom on the support member, the boom being selectively longitudinally extensible or retractable laterally of the column; and
   g. lock means retaining the boom in longitudinally adjusted positions.

2. A manipulator as defined in claim 1, in which:
   h. the mounting means includes:
      1. longitudinal tracks on the top and the bottom of the boom; and
      2. rollers attached to the support member and engaging the longitudinal tracks; and
   i. the lock means includes:
      1. a frame fixed to the support member and located adjacent the boom; and
      2. an adjustable threaded member carried by the frame and selectively engageable with the boom to retain the boom.

3. A manipulator as defined in claim 2, in which:
   j. a pair of said rollers are horizontally spaced both above and below the boom;
   k. the frame is disposed between the horizontally spaced rollers; and
   l. The boom includes a shoulder engageable with the frame to limit longitudinal extension of the boom.

4. A manipulator as defined in claim 1, in which:
   h. the tool is a welding head; and
   i. a wire reel is rotatively mounted on the support member of the parallelogram linkage, the wire being operatively connected to the welding head on the boom.

5. A manipulator as defined in claim 1, in which: a platform is mounted on and carried by the top of the column, the platform being adapted to support equipment compatible and cooperating with the tool carried by the boom.

6. A manipulator as defined in claim 5, in which: a pair of lugs are attached to and extend from opposite sides of the platform, and extend on opposite sides of the parallelogram linkage and boom, the lugs providing attachment points for convenient lifting of the manipulator.

7. A manipulator as defined in claim 1, in which:
   h. a limit switch is electrically associated with the height adjustment means; and
   i. means is carried by one of the bars and is engageable with the limit switch when the parallelogram linkage is either raised or lowered so as to deenergize the height adjustment means electrically and to determine the limits of pivotal movement of the linkage.

8. A manipulator as defined in claim 1, in which:
   h. a base carries the column;
   i. a substantially vertical swivel pin rotatively interconnects the base and column for rotation of the column about the axis defined by the swivel pin, the swivel axis being laterally offset from the column, being located between the boom and column, and being located substantially in the plane of the parallelogram linkage to provide counterweights on opposite sides of the swivel axis; and
   j. a lock means selectively clamps the swivel pin to preclude column rotation.

9. A manipulator as defined in claim 1, in which:
   h. a base carries the column;
   i. a foot member is attached to the column and extends laterally from the column in the direction of the parallelogram linkage;
   j. a substantially vertical swivel pin is fixed to the base and is rotatively mounted to the foot member to define a swivel axis; and
   k. a split lock collar is carried by the foot member and embraces the swivel pin, the lock collar selectively clamping the swivel pin to preclude column rotation.

10. A manipulator as defined in claim 9 in which: l. the height adjustment means includes a jackscrew pivotally connected to the lower bar of the parallelogram linkage, and pivotally connected to the column below the linkage, the jackscrew being located substantially in the plane of the parallelogram linkage and column foot member to provide a substantially balanced design and counterweights on opposite sides of the swivel axis.